United States Patent [19]

Gugumus

[11] Patent Number: 4,863,981
[45] Date of Patent: Sep. 5, 1989

[54] SYNERGISTIC MIXTURE OF STABILIZERS

[75] Inventor: Francois Gugumus, Allschwil, Switzerland

[73] Assignee: Ciba-Geigy Corporation, Hawthorne, N.Y.

[21] Appl. No.: 63,885

[22] Filed: Jun. 19, 1987

[30] Foreign Application Priority Data

Jun. 30, 1986 [CH] Switzerland ............ 2619/86

[51] Int. Cl.$^4$ ............ C08K 5/34; C08K 5/35; C08K 3/08
[52] U.S. Cl. ............ 524/97; 524/98; 524/100; 524/102; 524/425; 524/440; 252/401; 252/403
[58] Field of Search ......... 252/401, 403; 524/97, 524/100, 102, 425, 440, 98

[56] References Cited

U.S. PATENT DOCUMENTS

| | | | |
|---|---|---|---|
| 4,086,204 | 4/1978 | Cassandrini et al. | 528/374 |
| 4,233,412 | 11/1980 | Rody et al. | 525/440 |
| 4,331,586 | 5/1982 | Hardy | 525/186 |
| 4,344,876 | 8/1982 | Berner | 524/91 |
| 4,692,486 | 9/1987 | Gugumus | 524/100 |

FOREIGN PATENT DOCUMENTS 85130635 12/1983 Japan.
60-115644 6/1985 Japan.
60-124642 7/1985 Japan.

OTHER PUBLICATIONS

2244 Research Disclosure No. 255 Great Britain (7/85).

*Primary Examiner*—John Kight
*Assistant Examiner*—Kriellion Morgan
*Attorney, Agent, or Firm*—Harry Falber; JoAnn Villamizar

[57] ABSTRACT

The present invention relates to a stabilizer system containing two high-molecular polyalkylpiperidines, the use thereof for stabilizing organic material and the organic material which has been protected by means of the stabilizer system mentioned against degradation induced by light.

10 Claims, No Drawings

SYNERGISTIC MIXTURE OF STABILIZERS

The present invention relates to a stabilizer system containing two high-molecular polyalkylpiperidines, the use thereof for stabilizing organic material and the organic material which has been protected by means of the stabilizer system mentioned against degradation induced by light.

A number of high-molecular polyalkylpiperidines suitable for use as light stabilizers are known. For example, condensation and addition polymers containing sterically hindered piperidine groups are described in US-A No. 4,233,412, and triazine polymers containing piperidine groups are disclosed in US-A Nos. 4,086,204 and 4,331,586.

Mixtures of low-molecular and high-molecular polyalkylpiperidines are described in EP-A No. 80,431 as a stabilizer system for organic material.

Stabilized polyolefin compositions containing formamidines and polyalkylpiperidines are described in JP-A No. 85-115,644. Stabilized polyolefin compositions containing polyalkylpiperidines, sterically hindered phenols and phosphites are disclosed in JP-A No. 85-124,642.

The present invention relates to a stabilizer system containing (a) at least one polyalkyl piperidine of the formula I

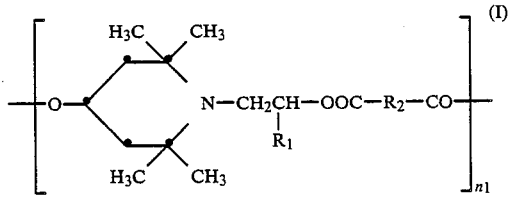

in which $R_1$ is hydrogen or methyl, $R_2$ is a direct bond or $C_1$–$C_{10}$-alkylene and $n_1$ is an integer from 2 to 100, and (b) at least one polyalkylpiperidine of the formula II

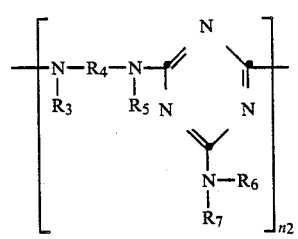

in which $R_3$, $R_5$ and $R_6$ independently of one another are hydrogen, $C_1$–$C_4$-alkyl, $C_5$–$C_8$-cycloalkyl, phenyl, phenyl which is substituted by —OH and/or $C_1$–$C_{10}$-alkyl, benzyl or benzyl which is substituted by —OH and/or $C_1$–$C_{10}$-alkyl or are a group of the formula III

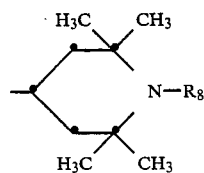

in which $R_8$ is hydrogen, O, cyanomethyl, $C_1$–$C_{12}$-alkyl, $C_1$–$C_{12}$-alkyl which is substituted by —OH, benzyl, $C_1$–$C_{12}$-acyl or $C_3$–$C_{12}$-alkenyl, subject to the condition that the C atom attached to the nitrogen atom of the piperidyl group is a primary carbon atom, $R_4$ is $C_2$–$C_{18}$-alkylene, cyclohexylene or 1,4-dimethylenecyclohexylene, or the radicals $R_3$, $R_4$ and $R_5$, together with the nitrogen atoms to which they are attached, form a 6-membered to 10-membered heterocyclic ring, $R_7$ is hydrogen, —OH, $C_1$–$C_{18}$-alkyl, $C_5$–$C_8$-cycloalkyl, phenyl, phenyl which is substituted by —OH and/or $C_1$–$C_{10}$-alkyl, benzyl or benzyl which is substituted by —OH and/or $C_1$–$C_{10}$-alkyl or is a group of the formula III, or $R_6$ and $R_7$, together with the nitrogen atom to which they are attached, form a 6-membered to 10-membered heterocyclic ring, $n_2$ is an integer from 2 to 100 and at least one of the radicals $R_3$, $R_5$, $R_6$ and $R_7$ is a piperidyl radical of the formula III.

Examples of $R_2$ as $C_1$–$C_{10}$-alkylene are 1,2-ethylene, 1,3-propylene, 1,2-propylene, tetramethylene, pentamethylene, 2,2-dimethyl-1,3-propylene, hexamethylene, heptamethylene, octamethylene or decamethylene. Linear $C_1$–$C_4$-alkylene is preferred and ethylene is particularly preferred.

Examples of $R_3$, $R_5$ and $R_6$ as $C_1$–$C_4$-alkyl are methyl, ethyl, propyl, isopropyl, n-butyl or tert.-butyl.

Examples of $R_3$, $R_5$, $R_6$ and $R_7$ as $C_5$–$C_8$-cycloalkyl are cyclopentyl, cyclohexyl or cyclooctyl.

Examples of $R_3$, $R_5$, $R_6$ and $R_7$ as phenyl which is substituted by —OH and/or $C_1$–$C_{10}$-alkyl are methylphenyl, dimethylphenyl, trimethylphenyl, tert.-butylphenyl or 3,5-ditert.-butyl-4-hydroxyphenyl. Phenyl which is substituted by —OH and/or $C_4$–$C_8$-alkyl is preferred, particularly 3,5-ditert.-butyl-4-hydroxyphenyl.

Examples of $R_3$, $R_5$, $R_6$ and $R_7$ as benzyl which is substituted by —OH and/or $C_1$–$C_{10}$-alkyl are methylbenzyl, dimethylbenzyl, trimethylbenzyl, tert.-butylbenzyl or 3,5-ditert.-butyl-4-hydroxybenzyl. Benzyl which is substituted by —OH and/or $C_4$–$C_8$-alkyl is preferred, particularly 3,5-di-tert.-butyl-4-hydroxybenzyl.

Examples of $R_4$ as $C_2$–$C_{18}$-alkylene are 1,2-ethylene, 1,3-propylene, 1,2-propylene, tetramethylene, pentamethylene, 2,2-dimethyl-1,3-propylene, hexamethylene, heptamethylene, octamethylene, decamethylene, dodecamethylene, tetradecamethylene, pentadecamethylene, hexadecamethylene or octadecamethylene. $R_4$ is preferably $C_2$–$C_8$-alkylene, particularly preferably hexamethylene.

Examples of 6-membered to 10-membered heterocyclic rings formed by the radicals $R_3$, $R_4$ and $R_5$ together with the nitrogen atoms to which they are attached, are

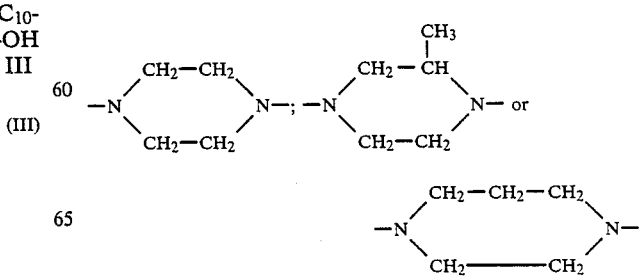

A 6-membered heterocyclic ring is preferred, particularly preferably

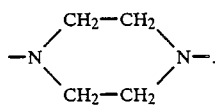

Examples of $R_7$ as $C_1$–$C_{18}$-alkyl are methyl, ethyl, propyl, isopropyl, n-butyl, tert.-butyl, pentyl, hexyl, octyl, 1,1,3,3-tetramethylbutyl, nonyl, decyl, dodecyl, tetradecyl, hexadecyl or octadecyl. $C_1$–$C_{10}$-alkyl is preferred, particularly 1,1,3,3-tetramethylbutyl.

Examples of $R_8$ as $C_1$–$C_{12}$-alkyl which can if appropriate be substituted by —OH are methyl, ethyl, propyl, isopropyl, 2-hydroxyethyl or 2-hydroxypropyl. $C_1$–$C_4$-alkyl, especially methyl, 2-hydroxyethyl and 2-hydroxypropyl are preferred.

Examples of $R_8$ as $C_3$–$C_{12}$-alkenyl are prop-2-enyl, but-2-enyl, hex-2-enyl or undec-10-enyl. Prop-2-enyl is preferred.

Examples of $R_8$ as $C_1$–$C_{12}$-acyl are benzoyl, $C_1$–$C_{12}$-alkanoyl, for example, formyl, acetyl, propionyl, butyryl, hexanoyl, octanoyl, decanoyl or dodecanoyl, or $C_3$–$C_{12}$-alkenoyl, for example acryloyl, methacryloyl or crotonoyl. Benzoyl, acetyl and crotonoyl are preferred.

The radicals $R_3$ and $R_5$ are preferably a group of the formula III in which $R_8$ is preferably hydrogen.

The radicals $R_6$ and $R_7$, together with the nitrogen atom to which they are attached, preferably form a 6-membered heterocyclic ring, for example pyrrolidin-1-yl, piperidino, piperazin-1-yl, 4-methylpiperazin-1-yl or morpholino. Morpholino is particularly preferred.

The meanings of the end groups which saturate the free valencies in the compounds of the formulae I and II depend on the processes used for their preparation.

The compounds of the formulae I and II are known (in some cases commercially available) and can be prepared by known processes, for example as described in US-A Nos. 4,233,412 and 4,086,204.

If the preparation of the compounds of the formula I is effected, for example, by reacting a compound of the formula

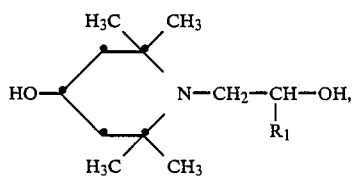

in which $R_1$ is hydrogen or methyl with a dicarboxylic acid diester of the formula

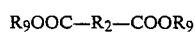

in which $R_9$ is, for example, methyl, ethyl or propyl and $R_2$ is as defined above, the end group attached to the 2,2,6,6-tetramethyl-4-oxypiperidin-1-yl radical is hydrogen or —CO—$R_2$—COOR$_9$, and the end group attached to the diacyl radical is —O—$R_9$ or

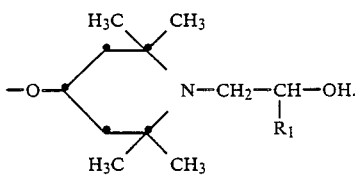

If the preparation of the compounds of the formula II is effected, for example, by reacting a compound of the formula

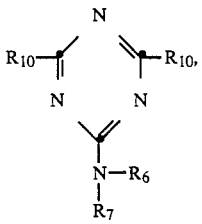

in which $R_{10}$ is, for example, chlorine and $R_6$ and $R_7$ are as defined above with a compound of the formula

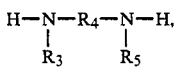

in which $R_3$, $R_4$ and $R_5$ are as defined above, the end group attached to the diamino radical is hydrogen or

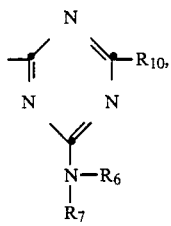

and the end group attached to the triazine radical is —$R_{10}$ or

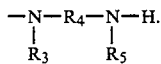

If $R_{10}$ is a halogen, for example chlorine, it is advantageous to replace this halogen, for example by —OH or an amino group, when the reaction is complete. The following may be mentioned as examples of amino groups: —NH$_2$, —NH($C_1$–$C_8$-alkyl), —N($C_1$–$C_8$-alkyl)$_2$, pyrrolidin-1-yl and morpholino.

A preferred stabilizer mixture contains (a) at least one polyalkylpiperidine of the formula I and (b) at least one polyalkylpiperidine of the formula II in which the radicals $R_3$, $R_5$ and $R_6$ independently of one another are hydrogen, $C_1$–$C_4$-alkyl, phenyl, phenyl which is substituted by —OH and/or $C_4$–$C_8$-alkyl, benzyl or benzyl which is substituted by —OH and/or $C_4$–$C_8$-alkyl or are a group of the formula III, $R_4$ is $C_2$–$C_8$-alkylene and $R_7$ is hydrogen, $C_1$–$C_{10}$-alkyl, phenyl, phenyl which is substituted by —OH and/or $C_4$–$C_8$-alkyl, benzyl or benzyl which is substituted by —OH and/or $C_4$–$C_8$-alkyl or is a group of the formula III or the radicals $R_6$ and R7, together with the nitrogen atom to which they are attached, form a 6-membered heterocyclic ring, and at least one of the radicals R3, R5, R6 and R7 is a group of the formula III.

A stabilizer mixture containing (a) at least one polyalkylpiperidine of the formula I and (b) at least one polyalkylpiperidine of the formula II in which R3 and R5 are a group of the formula III is also preferred.

R8 is preferably hydrogen, $C_1$–$C_4$-alkyl, $C_1$–$C_4$-alkyl which is substituted by —OH, benzyl, allyl, acetyl or crotonoyl and is particularly preferably hydrogen or methyl.

A stabilizer mixture which is of interest contains (a) at least one polyalkylpiperidine of the formula I and (b) at least one polyalkylpiperidine of the formula II in which R6 is hydrogen and R7 is $C_1$–$C_{10}$-alkyl, or R6 and R7, together with the nitrogen atom to which they are attached, form the group

$n_1$ and $n_2$ are each preferably an integer from 2 to 35, in particular 2 to 20, for example 5 to 10.

A stabilizer mixture which is particularly preferred contains (a) at least one polyalkylpiperidine of the formula I and (b) at least one polyalkylpiperidine of the formula II in which R3 and R5 are a group of the formula III, R4 is hexamethylene, R6 and R8 are hydrogen and R7 is 1,1,3,3-tetramethylbutyl or R6 and R7, together with the nitrogen atom to which they are attached, form a group

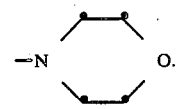

A stabilizer mixture which is of interest contains (a) at least one polyalkylpiperidine of the formula I in which R1 is hydrogen and R2 is $C_1$–$C_4$-alkylene, preferably ethylene, and (b) at least one polyalkylpiperidine of the formula II.

Stabilizer mixtures consisting of (a) at least one polyalkylpiperidine of the formula I and (b) at least one polyalkylpiperidine of the formula II are preferred.

Stabilizer mixtures containing 1 to 3, preferably 1 to 2, compounds of the formula I and 1 to 3, preferably 1 to 2, compounds of the formula II are of interest.

Stabilizer systems containing one compound of the formula I and two compounds of the formula II are also of interest.

Stabilizer mixtures containing one compound of the formula I and one compound of the formula II are of particular interest.

The following are examples of compounds of the formulae I and II:

Compound 1

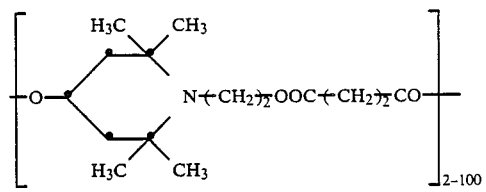

Compound 2

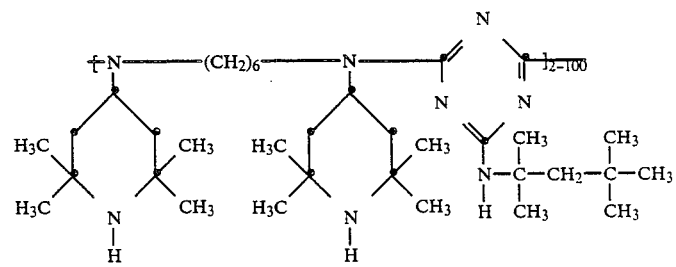

Compound 3

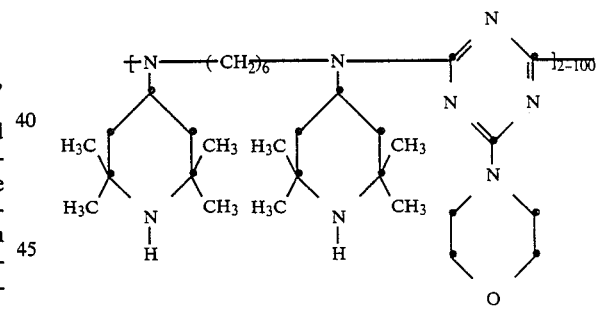

Stabilizer mixtures containing a combination of compounds 1 and 2 or 1 and 3 or 1, 2 and 3 are particularly advantageous.

The stabilizer mixture according to the invention is suitable for stabilizing organic materials against degradation induced by light. The following are examples of materials of this type:

1. Polymers of monoolefins and diolefins, for example polypropylene, polyisobutylene, polybut-1-ene, polymethylpent-1-ene, polyisoprene or polybutadiene and polymers of cycloolefins, for example cyclopentene or norbornene; and also polyethylene (which can, if appropriate, be crosslinked), for example high-density polyethylene (HDPE), low-density polyethylene (LDPE) or linear, low-density polyethylene (LLDPE).

2. Mixtures of the polymers mentioned under (1), for example mixtures of polypropylene with polyisobutylene, polypropylene with polyethylene (for example PP/HPDE or PP/LDPE) and mixtures of different types of polyethylene (for example LDPE/HDPE).

3. Copolymers of monoolefins and diolefins with one another or with other vinyl monomers, for example ethylene/propylene copolymers, linear, low-density polyethylene (LLDPE) and mixtures of the latter with low-density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers or ethylene/acrylic acid copolymers and salts thereof (ionomers), and also terpolymers of ethylene with propylene and a diene, such as hexadiene, dicyclopentadiene or ethylidenenorbornene; and also mixtures of such copolymers with one another and with polymers mentioned under 1, for example polypropylene-ethylene/propylene copolymers, LDPE-ethylene/vinyl acetate copolymers, LDPE-ethylene/acrylic acid copolymers, LLDPE-ethylene/vinyl acetate copolymers and LLPDE-ethylene/acrylic acid copolymers.

3a. Hydrocarbon resins (for example $C_5$–$C_9$), including hydrogenated modifications thereof (for example tackifier resins).

4. Polystyrene, poly-(p-methylstyrene) and poly-(α-methylstyrene).

5. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/maleic anhydride or styrene/acrylonitrile/methyl acrylate; mixtures of high impact strength composed of styrene copolymers and another polymer, for example a polyacrylate, a diene polymer or an ethylene/propylene/diene terpolymer; and block copolymers of styrene, for example styrene/butadiene/styrene, styrene/isoprene/styrene, styrene/ethylene-butylene/styrene or styrene/ethylene-propylene/styrene.

6. Graft copolymers of styrene or α-methylstyrene, for example styrene on polybutadiene, styrene on polybutadiene/styrene or polybutandiene/acrylonitrile copolymers or styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates or alkyl methacrylates on polybutadiene, styrene and acrylontrile on ethylene/propylene/diene terpolymers, styrene and acrylonitrile on polyalkyl acrylates or polyalkyl methacrylates, styrene and acrylonitrile on acrylate/butadiene copolymers and mixtures thereof with the copolymers mentioned under 5, such as are known, for example, as so-called ABS, MBS, ASA or AES polymers.

7. Polymers containing halogens, for example polychloroprene, chlorinated rubber, chlorinated or chlorosulfonated polyethylene, epichlorohydrin homopolymers and copolymers, especially polymers formed from halogen-containing vinyl compounds, for example polyvinyl chloride, polyvinylidene chloride, polyvinyl fluoride or polyvinylidene fluoride; and copolymers thereof, such as vinyl chloride/vinylidene chloride, vinyl chloride/vinyl acetate or vinylidene chloride/vinyl acetate.

8. Polymers derived from α,β-unsaturated acids and derivatives thereof, such as polyacrylates and polymethyacrylates, polyacrylamides and polyacrylonitriles.

9. Copolymers of the monomers mentioned under (8) with one another or with other unsaturated monomers, for example acrylonitrile/butadiene copolymers, acrylonitrile/alkyl acrylate copolymers, acrylonitrile/alkoxyalkyl acrylate copolymers, acrylonitrile/vinyl halide copolymers or acrylonitrile/alkyl methacrylate/butadiene terpolymers.

10. Polymers derived from unsaturated alcohols and amines or acyl derivatives or acetals thereof, such as polyvinyl alcohol, polyvinyl acetate, stearate, benzoate or maleate, polyvinyl butyral, polyallyl phthalate or polyallylmelamine; and copolymers thereof with olefins mentioned in item 1.

11. Homopolymers and copolymers of cyclic ethers, such as polyalkylene glycols, polyethylene oxide or polypropylene oxide, or copolymers thereof with bisglycidyl ethers.

12. Polyacetals, such as polyoxymethylene and also polyoxymethylenes containing comonomers, for example ethylene oxide; and polyacetals which have been modified with thermoplastic polyurethanes, acrylates or MBS.

13. Polyphenylene oxides and sulfides and mixtures thereof with styrene polymers or polyamides.

14. Polyurethanes derived on the one hand from polyethers, polyesters and polybutadienes having terminal hydroxyl groups and, on the other hand, from aliphatic or aromatic polyisocyanates, and precursors thereof.

15. Polyamides and copolyamides derived from diamines and dicarboxylic acids and/or aminocarboxylic acids or the corresponding lactams, such as polyamide 4, polyamide 6, polyamide 6/6, 6/10, 6/9, 6/12 or 4/6, polyamide 11 or polyamide 12, aromatic polyamides obtained from m-xylene, a diamine and adipic acid; polyamides prepared from hexamethylenediamine and isophthalic and/or terephthalic acid and, if appropriate, an elastomer as modifier, for example poly-2,4,4-trimethyllhexamethyleneterephthalamide or poly-m-phenyleneisophthalamide. Block copolymers of the polyamides mentioned above with polyolefins, olefin copolymers, ionomers or chemically linked or grafted elastomers; or with polyethers, for example polyethylene glycol, polypropylene glycol or polytetramethylene glycol. Also polyamides or copolyamides which have been modified with EPDM or A8S; and polyamides which have been subjected to condensation during processing ("RIM polyamide systems").

16. Polyureas, polyamides, polyamide-imides and polybenzimidazoles.

17. Polyesters derived from dicarboxylic acids and dialcohols and/or hydroxycarboxylic acids or the corresponding lactones, such as polyethylene terephthalate, polybutyleneterephthalate, poly-1,4-dimethylolcyclohexane terephthalate or polyhydroxybenzoates, and block polyether-esters derived from polyethers having hydroxyl end groups; and also polyesters which have been modified with polycarbonates or MBS.

18. Polycarbonates and polyester-carbonates.

19. Polysulfones, polyether-sulfones and polyetherketones.

20. Crosslinked polymers derived on the one hand from aldehydes and, on the other hand, from phenols, urea or melamine, such as phenol/formaldehyde, urea/formaldehyde and melamine/formaldehyde resins.

21. Drying and non-drying alkyd resins.

22. Unsaturated polyester resins derived from copolyesters of saturated and unsaturated dicarboxylic acids with polyhydric alcohols, and also vinyl compounds as crosslinking agents, and also halogen-containing modifications thereof of low combustability.

23. Crosslinkable acrylic resins derived from substituted acrylic acid esters, for example epoxyacrylates, urethaneacrylates or polyester-acrylates.

24. Alkyd resins, polyester resins and acrylate resins which have been crosslinked with melamine resins, urea resins, polyisocyanates or epoxide resins.

25. Crosslinked epoxide resins derived from polyepoxides, for example bisglycidyl ethers or cycloaliphatic diepoxides.

26. Natural polymers, such as cellulose, natural rubber or gelatin and polymer-homologous, chemically modified derivatives thereof, such as cellulose acetates, propionates and butyrates, and the cellulose ethers, such as methylcellulose; and also colophony resins and derivatives.

27. Mixtures (polyblends) of the abovementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP or PA/PPO.

28. Natural and synthetic organic substances which are pure monomeric compounds or mixtures thereof, for example mineral oils, animal or vegetable fats, oils and waxes, or oils, waxes and fats based on synthetic esters (for example phthalates, adipates, phosphates or trimellitates), and mixtures of synthetic esters with mineral oils in any desired ratios by weight, such as are used, for example, as spinning dressings, and aqueous emulsions thereof.

29. Aqueous emulsions of natural or synthetic rubbers, for example natural rubber latex or latices of carboxylated styrene/butadiene copolymers.

The invention also relates, therefore, to compositions containing organic material and the stabilizer mixture according to the invention.

The organic materials are preferably synthetic polymers, particularly those belonging to the groups indicated above. Polyolefins are preferred and polypropylene, polyethylene and copolymers thereof are particularly preferred.

The components (a) and (b) of the stabilizer system according to the invention can be added to the organic material to be stabilized on their own or mixed with one another. In this regard, the components (a) and (b) can be employed independently of one another in amounts from 0.01 to 4.99%, subject to the condition that the total amount of component (a) plus component (b) is 0.05 to 5%, preferably 0.05-2%, relative to the total weight of the material to be stabilized.

The stabilized polymer compositions of the invention can, in addition, also contain various conventional additives, for example the following:

1. Antioxidants 1.1. Alkylated monophenols, for example 2,6-di-tert.-butyl-4-methylphenol, 2-tert.-butyl-4,6-dimethylphenol, 2,6-di-tert.-butyl-4-ethylphenol, 2,6-di-tert.-butyl-4-n-butylphenol, 2,6-di-tert.-butyl-4-i-butylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert.-butyl-4-methoxymethylphenol and 2,6-dinonyl-4-methylphenol.

1.2. Alkylated hydroquinones, for example 2,6-di-tert.-butyl-4-methoxyphenol, 2,5-di-tert.-butylhydroquinone, 2,5-di-tert.-amylhydroquinone and 2,6-diphenyl-4-octadecyloxyphenol.

1.3. Hydroxylated thiodiphenyl ethers, for example 2,2'-thiobis-(6-tert.-butyl-4-methylphenol), 2,2'-thiobis-(4-octylphenol), 4,4'-thiobis-(6-tert.-butyl-3-methylphenol) and 4,4'-thiobis-(6-tert.-butyl-2-methylphenol).

1.4. Alkylidenebisphenols, for example 2,2'-methylenebis-(6-tert.-butyl-4-methylphenol), 2,2'-methylenebis-(6-tert.-butyl-4-ethylphenol), 2,2'-methylenebis-[4-methyl-6-($\alpha$-methylcyclohexyl)-phenol], 2,2'-methylenebis-(4-methyl-6-cyclohexylphenol), 2,2'-methylenebis-(6-nonyl-4-methylphenol), 2,2'-methylenebis-(4,6-di-tert.-butylphenol), 2,2'-ethylidenebis-(4,6-di-tert.-butylphenol), 2,2'-ethylidenebis-(6-tert.-butyl-4-isobutylphenol), 2,2'-methylenebis-[6-($\alpha$-methylbenzyl)-4-nonylphenol], 2,2'-methylenebis-[6-($\alpha,\alpha$-dimethylbenzyl)-4-nonylphenol] 4,4'-methylenebis-(2,6-di-tert.-butylphenol), 4,4'-methylenebis-(6-tert.-butyl-2-methylphenol), 1,1-bis-(5-tert.-butyl-4-hydroxy-2-methylphenyl)-butane, 2,6-bis-(3-tert.-butyl-5-methyl-2-hydroxybenzyl)-4-methylphenol, 1,1,3-tris-(5-tert.-butyl-4-hydroxy-2-methylphenyl)-butane, 1,1-bis-(5-tert.-butyl-4-hydroxy-2-methylphenyl)-3-n-dodecylmercaptobutane, ethylene glycol bis-[3,3-bis-(3'-tert.-butyl-4'-hydroxyphenyl)butyrate], bis-(3-tert.-butyl-4-hydroxy-5-methylphenyl)dicyclopentadiene and bis-[2-(3'-tert.-butyl-2'-hydroxy-5'-methylbenzyl)-6-tert.-butyl-4-methylphenyl]terephthalate.

1.5. Benzyl compounds, for example 1,3,5-tris-(3,5-di-tert.-butyl-4-hydroxybenzyl)-2,4,6-trimethylbenzene, bis-(3,5-di-tert.-butyl-4-hydroxybenzyl)sulfide, isooctyl 3,5-di-tert.-butyl-4-hydroxybenzylmercaptoacetate, bis-(4-tert.-butyl-3-hydroxy-2,6-dimethylbenzyl)-dithiol terephthalate, 1,3,5-tris-(3,5-di-tert.-butyl-4-hydroxybenzyl)isocyanurate, 1,3,5-tris-(4-tert.-butyl-3-hydroxy-2,6-dimethylbenzyl)isocyanurate, dioctadecyl 3,5-di-tert.-butyl-4-hydroxybenzylphosphonate, the calcium salt of monoethyl 3,5-di-tert.-butyl-4-hydroxybenzylphosphonate and 1,3,5-tris-(3,5-dicyclohexyl-4-hydroxybenzyl)isocyanurate.

1.6. Acylaminophenols, for example 4-hydroxylauranilide, 4-hydroxystearanilide, 2,4-bis-(octylmercapto)-6-(3,5-di-tert.-butyl-4-hydroxyanilino)-s-triazine and octyl N-(3,5-di-tert.-butyl-4-hydroxyphenyl)-carbamate.

1.7. The esters of $\beta$-(3,5-di-tert.-butyl-4-hydroxyphenyl)propionic acid with monohydric or polyhydric alcohols, for example methanol, octadecanol, 1,6-hexanediol, neopentylglycol, thiodiethylene glycol, diethylene glycol, triethylene glycol, pentaerythritol, trishydroxyethyl isocyanurate and N,N'-bis-(hyroxyethyl)-oxamide.

1.8. Esters of $\beta$-(5-tert.-butyl-4-hydroxy-3-methylphenyl)propionic acid with monohydric or polyhydric alcohols, for example methanol, octadecanol, 1,6-hexanediol, neopentylglycol, thiodiethylene glycol, diethylene glycol, triethylene glycol, pentaerythritol, trishydroxyethyl isocyanurate and N,N'-bis-hydroxyethyl oxamide.

1.9. Esters of $\beta$-(3,5-dicyclohexyl-4-hydroxyphenyl)-propionic acid with monohydric or polyhydric alcohols, for example methanol, octadecanol, 1,6-hexanediol, neopentyglycol, thiodiethylene glycol, diethylene glycol, triethylene glycol, pentaerythritol, tris-hydroxyethyl isocyanurate and N,N'-bis-hydroxyethyl oxamide.

1.10. Amides of β-(3,5-di-tert.-butyl-4-hydroxyphenyl)propionic acid, for example N,N'-bis-(3,5-di-tert.-butyl-4-hydroxyphenylpropionyl)-hexamethylenediamine, N,N'-bis-(3,5-di-tert.-butyl-4-hydroxyphenylpropionyl)-trimethylenediamine and N,N'-bis-(3,5-di-tert.-butyl-4-hydroxyphenylpropionyl)hydrazine.

2. UV absorbers and light stabilizers 2.1. 2-(2'-Hydroxyphenyl)-benzotriazoles, for example the 5'-methyl, 3',5'-di-tert.-butyl, 5'-tert.-butyl, 5'-(1,1,3,3-tetramethylbutyl), 5-chloro-3',5'-di-tert.-butyl, 5-chloro-3'-tert.-butyl-5'-methyl, 3'-sec.butyl-5'-tert.butyl, 4'-octoxy, 3',5'-di-tert.amyl or 3'5'-bis-(α,α-dimethylbenzyl) derivative.

2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy or 2'-hydroxy-4,4'-dimethoxy derivative.

2.3. Esters of substituted or unsubstituted benzoic acids, for example 4-tert.-butylphenyl salicylate, phenyl salicylate, octylphenyl salicylate, dibenzoylresorcinol, bis-(4-tert.-butylbenzoyl)-resorcinol, benzoylresorcinol, 2,4-di-tert.-butylphenyl 3,5-di-tert.-butyl-4-hydroxybenzoate and hexadecyl 3,5-di-tert.-butyl-4-hydroxybenzoate.

2.4. Acrylates, for example ethyl or isooctyl α-cyano-β,β-diphenylacrylate, methyl α-carbomethyoxycinnamate, methyl or butyl α-cyano-β-methyl-p-methoxycinnamate, methyl α-carbomethoxy-p-methoxy cinnamate and N-(β-carbomethoxy-β-cyanovinyl)-2-methylindoline.

2.5. Nickel compounds, for example nickel complexes of 2,2'-thiobis-[4-(1,1,3,3-tetramethylbutyl)-phenol], such as the 1:1 or 1:2 complex, if appropriate containing additional ligands, such as n-butylamine, triethanolamine or N-cyclohexyldiethanolamine, nickel dibutyldithiocarbamate, nickel salts of monoalkyl esters of 4-hydroxy-3,5-di-tert.-butylbenzylphosphonic acid, such as the methyl or ethyl ester, nickel complexes of ketoximes, such as 2-hydroxy-4-methylphenylundecyl ketone oxime and nickel complexes of 1-phenyl-4-lauroyl-5-hydroxypyrazole, if appropriate containing additional ligands.

2.6. Sterically hindered amines, for example bis-(2,2,6,6-tetramethylpiperidyl)sebacate, bis-(1,2,2,6,6-pentamethylpiperidyl)sebacate, bis(1,2,2,6,6-pentamethylpiperidyl) n-butyl-3,5-di-tert.-butyl-4-hydroxybenzylmalonate, the condensation product formed from 1-hydroxyethyl-2,2,6,6-tetramethyl-4-hydroxypiperidine and succinic acid, the condensation product formed from N,N'-bis-(2,2,6,6-tetra-methyl-4-piperidyl)-hexamethylenediamine and 4-tert.-octylamino-2,6-dichloro-1,3,5-s-triazine, tris-(2,2,6,6-tetramethyl-4-piperidyl)nitrilotriacetate, tetrakis-(2,2,6,6-tetramethyl-4-piperidyl) 1,2,3,4-butanetetraoate and 1,1'-(1,2-ethanediyl)-bis-(3,3,5,5-tetramethylpiperazinone).

2.7. Oxamides, for example 4,4'-dioctyloxyoxanilide, 2,2'-dioctyloxy-5,5'-di-tert.-butyloxanilide, 2,2'-didodecyloxy-5,5'-di-tert.-butyloxanilide, 2-ethoxy-2'-ethyloxanilide, N,N'-bis-(3-dimethylaminopropyl)-oxamide, 2-ethoxy-5-tert.-butyl-2'-ethyloxanilide and a mixture thereof with 2-ethoxy-2'-ethyl-5,4'-di-tert.-butyloxanilide and mixtures of o- and p-methoxy-disubstituted and o- and p-ethoxy-disubstituted oxanilides.

3. Metal deactivators, for example N,N'-diphenyloxamide, N-salicylal-N'-salicyloylhydrazine, N,N'-bis-(salicycloyl)-hydrazine, N,N'-bis-(3,5-di-tert.-butyl-4-hydroxyphenylpropionyl)hydrazine, 3-salicyloylamino-1,2,4-triazole and bis-(benzylidene)-oxalic acid dihydrazide.

4. Phosphites and phosphonites, for example triphenyl phosphite, diphenyl alkyl phosphites, phenyl dialkyl phosphites, tris-(nonylphenyl)phosphite, trilaurylphosphite, trioctadecylphosphite, distearyl pentaerythritol diphosphite, tris-(2,4-di-tert.-butylphenyl)-phosphite, diisodecyl pentaerythritol diphosphite, bis-(2,4-ditert.-butylphenyl)pentaerythritol diphosphite, tristearyl sorbitol triphosphite, tetrakis-(2,4-di-tert.-butylphenyl) 4,4'-biphenylenediphosphonite and 3,9-bis-(2,4-di-tert.-butylphenoxy)-2,4,8,10-tetraoxa-3,9-diphosphaspiro[5.5]undecane.

5. Compounds which destroy peroxides, for example esters of β-thiodipropionic acid, for example the lauryl, stearyl, myristyl or tridecyl ester, mercaptobenzimidazole, the zinc salt of 2-mercaptobenzimidazole, zinc dibutyldithiocarbamate, dioctadecyl disulfide and pentaerythritol tetrakis-(β-dodecylmercapto)-propionate.

6. Polyamide stabilizers, for example copper salts in combination with iodides and/or phosphorous compounds, and salts of divalent manganese.

7. Basic co-stabilizers, for example melamine, polyvinylpyrrolidone, dicyanodiamide, triallyl cyanurate, urea derivatives, hydrazine derivatives, amines, polyamides, polyurethanes, alkali metal and alkaline earth metal salts of higher fatty acids, for example Ca stearate, Nz stearate, Mg stearate, Na ricinoleate or K palmitate, antimony pyrocatecholate or tin pyrocatecholate.

8. Nucleating agents, for example 4-tert.-butylbenzoic acid, adipic acid and diphenylacetic acid.

9. Fillers and reinforcing agents, for example calcium carbonate, silicates, glass fibres, asbestos, talc, kaolin, mica, barium sulfate, metal oxides and hydroxides, carbon black and graphite.

10. Other additives, for example plasticizers, lubricating agents, emulsifiers, pigments, fluorescent brighteners, fireretarding agents, antistatic agents and blowing agents.

The ratio by weight of stabilizer mixture according to the invention to additional additives can be, for example, 1:0.5 to 1:5.

The incorporation of the stabilizer mixture according to the invention or of the individual components into the organic material is effected by known methods, for example before or during shaping or by applying the compounds, in solution or in dispersion, to the organic material, with or without subsequent removal of the solvent by evaporation. The individual components of the stabilizer system according to the invention can also be added to the materials to be stabilized in the form of a master-batch containing these components in a concentration of, for example, 2.5 to 25% by weight.

The mixtures according to the invention and their components can also be added before or during polymerization or before crosslinking.

The materials thus stabilized can be used in a very wide variety of shapes, for example as sheeting, fibres, tapes, moulding materials or profiles or as binders for lacquers, adhesives or putties.

A preferred embodiment of the invention is constituted by compositions containing the stabilizer system according to the invention and organic material, wherein the composition do not contain sterically hindered formamidines, in particular formamidines containing the structural unit

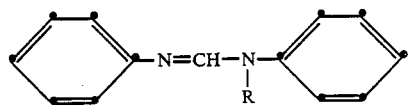

in which R is alkyl or phenyl.

The invention also relates to the use of a stabilizer system containing (a) at least one polyalkylpiperidine of the formula I and (b) at least one polyalkyl piperidine of the formula II, for stabilizing organic material against degradation induced by light.

The following examples illustrate the invention further. All percentages are by weight, unless stated otherwise.

EXAMPLE 1:

Light stabilizing action in polypropylene fibres 1,000 parts of unstabilized polypropylene powder (melt flow index at 230° C. and a testing force of 2.16 kp: approx. 15 g/10 minutes) are mixed in a high-speed mixer with 0.5 part of calcium monoethyl 3,5-di-tert.-butyl-4-hydroxybenzylphosphonate, 0.5 part of tris-(2,4-di-tert.-butylphenyl)phosphite, 2.5 parts of titanium dioxide, 1 part of calcium stearate and 3 parts of the light stabilizer listed in Table 1, and are then extruded and granulated at 220° C. in an extruder. The resulting granules are spun in a laboratory melt-spinning machine at a maximum temperature of 270° C. at a rate of 10 m/s to give a multifilament of 12.1 decitex. This filament is stretched and twisted by means of a draw-twister. The stretching ratio is 1:3.2, so that multifilaments of 3.9 decitex are finally obtained. These multifilaments are mounted on white cardboard, subjected to treatment at 120° C. in an oven for 20 minutes (simulation of "tentering") and are then exposed to light in a Xenotest 1200.

The exposure time required to reach a 50% loss of ultimate tensile strength is taken as a measure of the stabilizing action.

The results are summarized in Table 1.

TABLE 1

| Light stabilizing action in polypropylene multifilament (3.9 decitex) | |
|---|---|
| Light stabilizer | Hours in xenotest 1200 until 50% of residual ultimate tensile strength is reached |
| None | 450 |
| 0.3% of compound 1 | 3,200 |
| 0.3% of compound 2 | 3,600 |
| 0.15% of compound 1 and 0.15% of compound 2 | 4,500 |

Compound 1

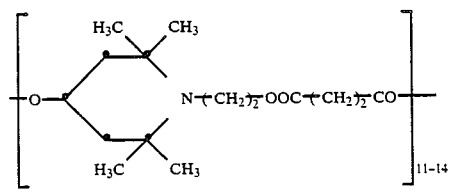

Compound 2

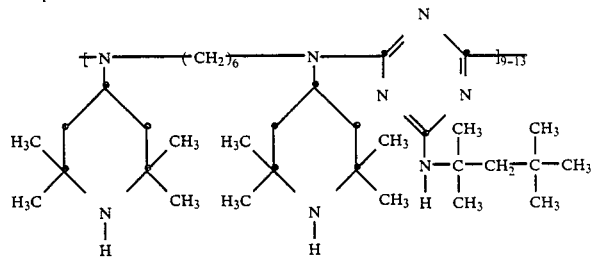

EXAMPLE 2

Light stabilizing action in high-pressure polyethylene film 1,000 parts of polyethylene (density 0.918 g/cm$^3$; melt flow index at 190° C. and a testing force of 2.16 kp: approx. 2 g/10 minutes) are mixed with 0.3 parts of n-octadecyl-3-(3',5'-di-tert.-butyl-4'-hydroxyphenyl)-propionate and 1.5 parts of the light stabilizer listed in Table 2 in a high-speed mixer, and the mixture is then extruded and granulated at 200° C. Tubular films 200 μm thick are blown from the granules thus obtained (blow head temperature 200° C.; blow-up ratio 1:1.8). Sections measuring 55×9 mm$^2$ are punched out of these films and exposed to light in an exposure apparatus (SAIREM-SEPAP 12.24). The test specimens are taken out of the exposure apparatus at regular intervals and their carbonyl content is checked in an IR spectrophotometer. The increase in the carbonyl extinction during exposure is a measure of the photo-oxidative degradation of the polymer (see L. Blaban et al., J. Polymer Sci. Part C, 22, 1059-1071 (1969); J. F. Heacock, J. Polymer Sci. Part A-1, 22, 2921-2934 (1969); D. J. Carlsson and D. M. Wlles, Macromolecules 2, 587-606 (1969) and, according to experience, is associated with a falling off in the mechanical properities of the polymer.

The time required to reach a carbonyl extinction of 0.100 is taken as a measure of the stabilizing action.

The results are summarized in Table 2.

TABLE 2

| Light stabilizer | Light stabilizing action in high-pressure polyethylene films — Hours in SAIREM-SEPAP 12.24 until a carbonyl extinction of 0.1 is reached |
|---|---|
| None | 120 |
| 0.15% of compound 1 | 1,640 |
| 0.15% of compound 2 | 1,960 |
| 0.075% of compound 1 and 0.075% of compound 2 | 2,180 |

Compound 1

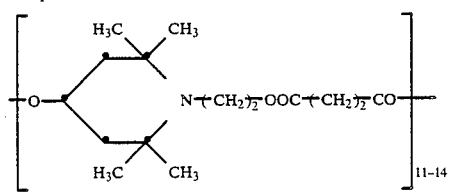

Compound 2

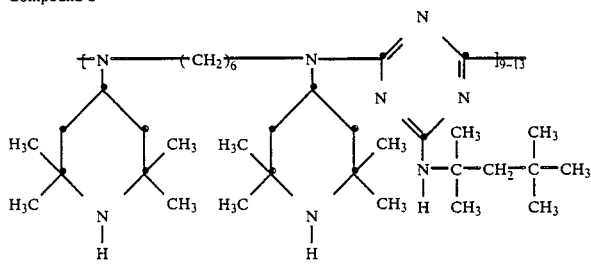

Examples 1 and 2 show clearly that the mixture of specific high-molecular polyalkylpiperidines displays a pronounced synergism in providing protection against the degradation, induced by light, of organic material.

What is claimed is:

1. A stabilizer mixture containing
 (a) at least one polyalkylpiperidine of the formula I

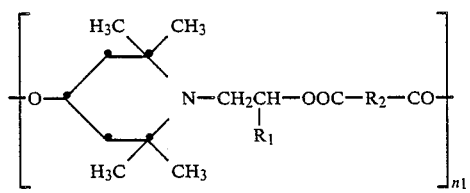

in which $R_1$ is hydrogen or methyl, $R_2$ is a direct bond or $C_1$–$C_{10}$-alkylene and $n_1$ is an integer from 2 to 100, and
 (b) at least one polyalkylpiperidine of the formula II

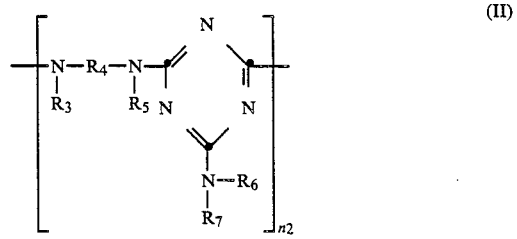

in which $R_3$, $R_5$ and $R_6$ independently of one another are hydrogen, $C_1$–$C_4$-alkyl, phenyl, phenyl which is substituted by —OH, $C_4$–$C_8$-alkyl or both, benzyl or benzyl which is substituted by —OH, $C_4$–$C_8$-alkyl or both or are a group of the formula III

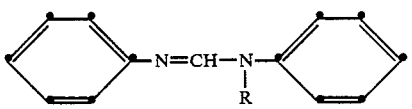

in which $R_8$ is hydrogen or methyl, $R_4$ is $C_2$–$C_8$-alkylene, $R_7$ is hydrogen, $C_1$–$C_{10}$-alkyl, phenyl, phenyl which is substitued by —OH, $C_4$–$C_8$-alkyl or both, benzyl or benzyl which is substituted by —OH, $C_4$–$C_8$-alkyl or both or is a group of the formula III, or $R_6$ and $R_7$, together with the nitrogen atom to which they are attached, form a pyrrolidinyl-1-yl, piperidino, piperazin-1-yl, 4-methyl-piperazin-1-yl or morpholino group, $n_2$ is an integer from 2 to 100 and at least one of the radicals $R_3$, $R_5$, $R_6$ and $R_7$ is a piperidyl radical of the formula III, with the proviso that the stabilizer mixture does not contain a formamidine containing the structural unit

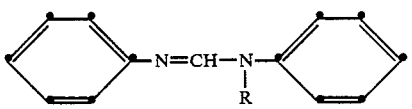

in which R is alkyl or phenyl.

2. a stabilizer mixture according to claim 1, in which $R_3$ and $R_5$ are a group of the formula III.

3. A stabilizer mixture according to claim 1, in which $R_6$ is hydrogen and $R_7$ is $C_1$–$C_{10}$-alkyl, or $R_6$ and $R_7$, together with the nitrogen atom to which they are attached, form the group

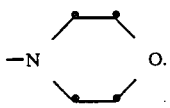

4. a stabilizer mixture according to claim 3, in which the radicals $R_6$ and $R_7$, together with the nitrogen atom to which they are attached, form the group

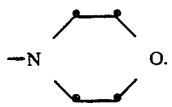

5. A stabilizer mixture according to claim 1, in which $n_1$ and $n_2$ independently of one another are integers from 2 to 35.

6. A stabilizer mixture according to claim 1, in which $R_3$ and $R_5$ are a group of the formula III, $R_4$ is hexamethylene, $R_6$ and $R_8$ are hydrogen and $R_7$ is 1,1,3,3-tetramethylbutyl, or $R_6$ and $R_7$, together with the nitrogen atom to which they are attached, form a group

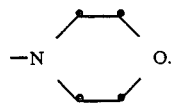

7. A stabilizer mixture according to claim 1, in which $R_2$ is $C_1$–$C_4$-alkylene and $R_1$ is hydrogen.

8. A stabilizer mixture according to claim 7, in which $R_2$ is ethylene.

9. A composition of matter containing a polyolefin subject to degradation induced by light, stabilized with an effective stabilizing amount of a stabilizer mixture according to claim 1.

10. A method for stabilizing a polyolefin against degradation induced by light, which comprises incorporating into said polyolefin an effective stabilizing amount of a stabilizer mixture according to claim 1.

* * * * *